United States Patent [19]

Lehmkuhl et al.

[11] Patent Number: 4,861,492
[45] Date of Patent: Aug. 29, 1989

[54] METHOD OF DEWATERING SEWAGE SLUDGE PARTICULARLY ON RECESSED PLATE PRESSING EQUIPMENT

[75] Inventors: Josef Lehmkuhl, Hofheim/Ts.; Ulrich Nikesch, Usingen; Kurt Presslein, Buettelborn, all of Fed. Rep. of Germany

[73] Assignee: Nalco Chemical Company, Naperville, Ill.

[21] Appl. No.: 92,509

[22] Filed: Sep. 3, 1987

[30] Foreign Application Priority Data

Sep. 9, 1986 [DE] Fed. Rep. of Germany ....... 3630666

[51] Int. Cl.$^4$ ............................................. C02F 11/14
[52] U.S. Cl. .................................... 210/709; 210/710; 210/727; 210/734; 210/745
[58] Field of Search ................. 210/10, 709, 710, 725, 210/727, 728, 734, 741, 745, 96.1, 768, 103, 231, 400, 401

[56] References Cited

U.S. PATENT DOCUMENTS

| 3,493,501 | 2/1970 | Eck ...................... 210/734 |
| 3,531,404 | 9/1970 | Goodman et al. ................... 210/400 |
| 4,105,558 | 8/1978 | Heinrich et al. .................... 210/202 |
| 4,151,080 | 4/1979 | Zuckerman et al. ............... 210/105 |
| 4,198,298 | 4/1980 | Zuckerman et al. .............. 210/96.1 |
| 4,341,628 | 7/1982 | Fujinami et al. .................... 210/101 |
| 4,397,746 | 8/1983 | Kratochvil ........................... 210/231 |
| 4,404,099 | 9/1983 | Austin ................................. 210/400 |
| 4,411,797 | 10/1983 | Sander et al. ....................... 210/727 |
| 4,415,446 | 11/1983 | Osborne .............................. 210/101 |
| 4,431,548 | 2/1984 | Lipowski et al. .................... 210/734 |
| 4,439,325 | 3/1984 | Blais .................................... 210/103 |
| 4,479,879 | 10/1984 | Hashimoto et al. ................ 210/734 |
| 4,576,723 | 3/1986 | Eisenlauer et al. ................. 210/745 |
| 4,659,483 | 4/1987 | Gries .................................. 210/96.1 |
| 4,675,116 | 6/1987 | Hoyland ............................. 210/709 |

FOREIGN PATENT DOCUMENTS

| 2249607 | 4/1974 | Fed. Rep. of Germany . |
| 2302142 | 4/1974 | Fed. Rep. of Germany . |
| 2432482 | 4/1980 | France ............................... 210/745 |
| 53-28853 | 3/1978 | Japan . |
| 791627 | 12/1980 | U.S.S.R. . |

Primary Examiner—Peter Hruskoci
Attorney, Agent, or Firm—John G. Premo; Anthony L. Cupoli; Donald G. Epple

[57] ABSTRACT

Method for dewatering sewage sludge with the aid or organic polymeric flocculating agents (polyelectrolytes) made preferably by emulsion polymerization. To obtain optimum dewatering results, a substantial amount of the aqueous phase of the sludge is removed by decantation after flocculant addition prior to the dewatering treatment proper. The flocculated and thickened sludge may then be dewatered much more quickly with the dewatering behavior improved additionally by causing a reactivating flocculation to take place on the delivery side of the sludge feed pump. The Figures show a preferred embodiment of the inventive sludge dewatering system using a recessed plate press.

6 Claims, 1 Drawing Sheet

METHOD OF DEWATERING SEWAGE SLUDGE PARTICULARLY ON RECESSED PLATE PRESSING EQUIPMENT

PRIORITY

This application claims priority based on West Germany Patent Application No. P 36 30 666.5, filed Sept. 9, 1986.

FIELD OF THE INVENTION

The invention relates to a method and apparatus for dewatering sewage sludges with the aid of organic polymeric flocculants (polyelectrolytes) made preferably by emulsion polymerization.

BACKGROUND OF THE INVENTION

Sewage sludges particularly from community sewage clarification plants (digested sludge, raw sludge) generally contain more than 90% water. For economic disposal - such as dumping or incineration - sewage sludges are dewatered using suitable dewatering plants. Dewatered sludge will contain only 75% to 50% water and in this condition is referred to as "disposable". Suitable dewatering equipment includes band filter presses, centrifuges and recessed plate pressing apparatus.

The dewatering of sewage sludges calls for conditioning with dewatering aids. Where dewatering is carried out using centrifuges or band filter presses, it has been common practice for decades to add organic polyelectrolytes to act as flocculating agents.

For dewatering in recessed plate pressing equipment, it has been common practice in the past to use inexpensive inorganic additives such as ferrous salts and lime. The amounts required for such additives are so great that in many cases the conditioning agents make up more than 50% of the filter cake solids, resulting in a substantial increase in transportation and disposal costs. It has been known for some time now that organic polyelectrolytes may form pressure-stable solids agglomerates that dewater readily in centrifuges, band filter presses and in recessed plate equipment.

Apart from lower costs, the advantages of using organic conditioning flocculants include the absence of undesirable constituents to be disposed of together with the filter cake, reduced capital investment, and the possibility of incinerating dewatered sewage sludge from recessed plate pressing equipment.

In general, the sludge to be dewatered is stored in thickening containers, transported to the recessed plate press building and then conditioned and dewatered. In conventional conditioning using inorganic additives such as lime and ferrous salts, the sludge is agitated batch-wise in suitable conditioning containers and then pumped into the recessed plate pressing equipment preferably by piston-diaphragm-type pumps.

In the past, sludge conditioning using organic polymers was carried out in a similar manner, with the amount of flocculant added proportional to solids content (German Pat. No. 33 46 834). Preferably, the flocculant solution was added on the delivery side of the sludge pump so as to avoid mechanical floc destruction in the sludge pump. In-line addition on the delivery side of the feed pumps is hard to cope with, however, as the great variance of sludge throughput and flow rates between the starting phase of a batch (e.g. 40 cu.m. of sludge per hour) and its final or high pressure phase (e.g. 4 cu.m. of sludge per hour) renders optimum flocculation and admixture exceedingly difficult. In general, the flocculant solution has to be added in a highly dilute form (0.1%-0.5% solution) so that hydraulic loading on the recessed plate press and pressing times in polymer conditioning will increase.

Attempts have been made to avoid this disadvantage by a preliminary water separation treatment. In the past, this approach has required the use of mechanical dewatering units (revolving screens); cf. DE-As specification No. 29 20 350. A disadvantage of the prior process is the equipment of using additional machinery and additional energy consumers.

In work which contributed to the present invention, it has been shown that the sludge so flocculated and mechanically loaded in the additional dewatering unit had to be reactivated so as to enable the subsequent dewatering treatment to be carried out in an efficient manner.

The object underlying the present invention is to provide a method of dewatering sewage sludge which decreases hydraulic loading in pressure filtration, reduces dewatering times and enhances filtering performance without calling for additional equipment such as preparatory dewatering units.

At the same time, the invention seeks to provide high solids filter cakes which come off readily and by themselves from the filter cloth used in recessed plate pressing installations.

SUMMARY

To obtain optimum dewatering results, a substantial amount of the aqueous sludge phase is separated by decantation after polymeric flocculant (i.e. polyelectrolyte) addition prior to the dewatering treatment proper. Subsequent dewatering of the flocculated and thickened sludge will require much less time, with the dewatering behavior improved additionally by reactivating flocculation caused to take place on the delivery side of the sludge pumps.

According to the inventive method, the flocculated sludge is thickened in a conditioning container in the absence of mechanical strain prior to being supplied to the decanting equipment, while part of the sludge water is separated by decanting. After flocculation and excess water decantation, the sewage sludge is in a substantially thickened form so that hydraulic loading in subsequent pressure filtration - in apparatus such as a recessed plate pressing plant - will be decreased considerably, resulting in reduced dewatering times.

These figures show component stages of a preferred embodiment of a sludge dewatering system using a recessed plate pressing plant.

DESCRIPTION OF THE INVENTION

Figure 1:
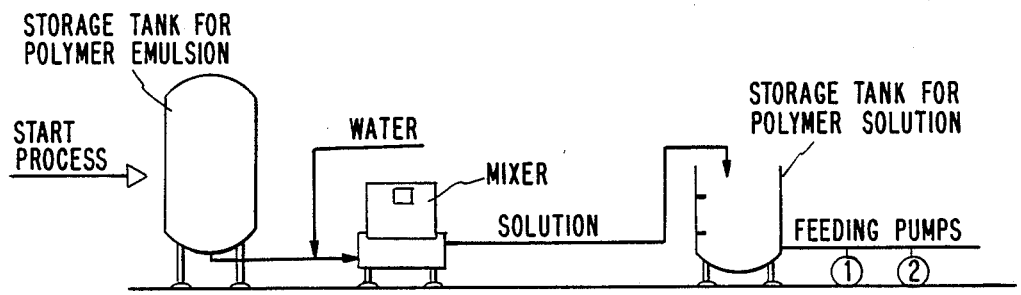
FIG. 1 depicts a diagrammatic view of flocculant producing apparatus usable for practicing the invention.

FIG. 1 is the first stage of an apparatus usable for the invention. FIG. 1 shows the preparation of the flocculant solution (preferably 0.2-1.5% by weight) by phase inversion of a polymer (polyelectrolyte) made by emulsion polymerization in apparatus such as the admixing and metering systems offered under the designations "Nalmat" or "Optimer" by Deutsche Nalco Chemie GmbH. (cf. Nalco publications F 20: "Nalmat, Das Neue Nalco-Dosiersystem", and F 30: "Optimer IL, Ein Neues Dosiersystem"). In FIG. 1, there is shown a supply pump 1 used for supplying flocculant solution to primary flocculation; reference number 2 identifies the pump which transports flocculant solution to secondary flocculation.

Polymer emulsion is stored in a storage tank. Emulsion is piped to a mixer where both water and the emulsion are added. Using known techniques, emulsion is inverted. The resulting solution is stored in storage tank. The solution is pumped from the storage tank by dosage pumps 1 and/or 2.

Figure 2:
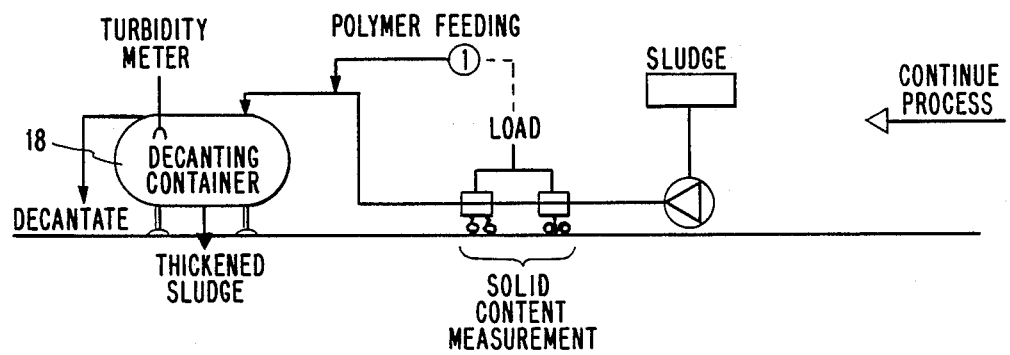
FIG. 2 depicts a diagrammatic view of decantation equipment usable for practicing the invention.

FIG. 2 is the second stage of the dewatering apparatus. It is connected to and part of the apparatus FIG. 1. FIG. 2 shows the decantation phase in a decanting container upstream of the dewatering treatment, with the flocculant for primary flocculation being metered through pump 1 into the decanting container inlet to provide mixing of the flocculant and the sludge for thickening the sludge. Flocculant supply is controlled in proportion to sewage sludge solids content by measuring sludge flow (cubic meters per hour, for instance) and dry solids percentage with the aid of suitable instrumentation (e.g. a sludge meter). The thickened sludge is withdrawn and the released water decanted over suitable overflow structure. Decanting and sludge level are controlled by turbidity measuring apparatus and level sensing means such as a level probe.

Figure 3:
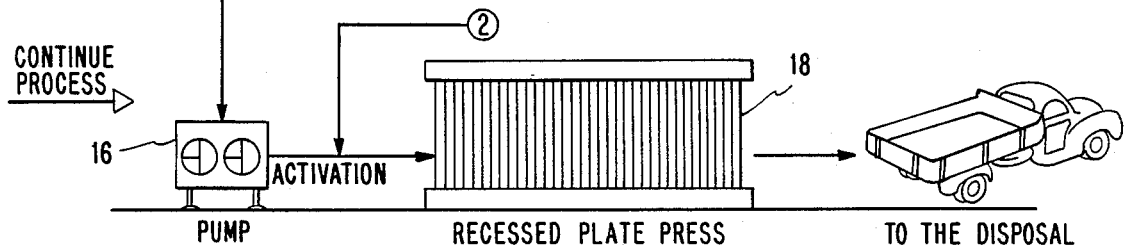
FIG. 3 depicts a diagrammatic view of sludge reactivation and filtering equipment usable for practicing the invention.

FIG. 3, is the third stage of the dewatering apparatus which follows stage 2 depicted in FIG. 3. The thickened sludge withdrawn from the decanting container by means of a high pressure pump 16 has flocculant added thereto by pump 2 prior to entering the recessed plate press so as to undergo secondary flocculation and to be reactivated thereby. The filter cloth 18 having been hydrophobed, the sludge cake will drop away from it be itself to be collected and transported to disposal. The resultant self-cleaning effect insures continuous operation for extended periods of time.

It is necessary to condition sewage sludges prior to dewatering; polymeric flocculants (polyelectrolytes) are particularly suitable for this use. To obtain good water from solids separation, the sludge has to undergo total flocculation, i.e. the formation of large size stable agglomerates which when under mechanical strain will primarily exude water without being destroyed prematurely. Flocculants are effective in a dilute form only and must be admixed intimately to the sludge to be dewatered. In general, the concentration of the flocculant solution added is 0.1–0.5% by weight, i.e. flocculation for subsequent dewatering will cause additional water to be added to the sludge.

For preparing effective flocculant solutions, it is preferred to use the method described in German Pat. No. 21 54 081 for inverting polyelectrolytes made by emulsion polymerization in water. In accordance with the present invention, preference is given to emulsion polymers such as the polyelectrolyte Nalco liquid polymers. It has been known that emulsion polymerization yields polymers having a very high molecular weight and few branches; in addition, their molecular weight distribution is narrowed.

High molecular weight polyelectrolytes are not effective unless they have the form of a dilute aqueous solution. An essential advantage of these liquid polymers is that they are dissolved in the inner polyelectrolyte containing aqueous phase already and can be activated fully by dilution or "inversion" of the emulsion; this process is referred to as inversion (phase inversion). Physically, it amounts to the concentrated water-in-oil emulsion, changing state to become a dilute oil-in-water emulsion, with a hydrophilic tenside contributing to the process. During inversion, the outer hydrocarbon phase is emulsified so that the inner polymer-containing aqueous phase will be diluted by the dissolving water, causing the coiled polymer chains to extend like springs and to be activated by hydration.

In contrast to polymers in powder form, liquid polymers will activate quickly by dilution with water and do not require extended maturation times.

Conveniently, the latex polymer is inverted in water in a mixer unit and will quickly reach maximum flocculation activity so that ready-to-use flocculant solutions may be prepared in a very short period of time.

Total sewage sludge flocculation requires about 200 to 600 grams of flocculant (based on emulsion polymer) per cubic meter of sludge. This quantity must be diluted with water in a ratio of about 1:200 (=0.5% solution) and preferably in a ratio of about 1:500 (=0.2%). As a result, the dilute flocculant solution introduces an additional 100–250 liters of water per cubic meter of sludge although the idea is to dewater the sludge.

In the past, the dilute flocculant solution was admixed to the sludge preferably in blenders, conditioning containers or in-line in a suitable conduit.

In accordance with the inventive process, brief and intensive flocculant admixture to the sludge causes large-size solids agglomerates to form which sediment rapidly under gravity and proceed to thicken without further mechanical strain. Surprisingly, this effect will be obtained also in case the container—and thus the effective clarification surface—is relatively small and retention time is short.

Where a horizontally disposed container having a volume of about 20 cu.m., a diameter of about 2.5 m and a length of about 4 m has flocculated sludge supplied thereto at one end at a rate of 50–100 cu.m. per hour, clear water will discharge at the overflow at the opposite end of the container, and thickened sludge may be withdrawn at the container bottom. This is the case with the decanting container depicted in FIG. 2.

In order to maintain continuous operation wherein optimum water separation is upheld despite a withdrawal of varying amounts of sludge, according to the invention, turbidity has been measured at the overflow end of the decanting container so as to monitor the results of the sedimentation process. Turbidity measurement was adjusted so as to respond to sludge overflow by generating a signal utilized to interrupt sludge delivery to the container. Once a probe 18 inside the container detects a level lower than minimum, sludge feed to the container is turned on again, causing the container to fill with flocculated sludge to sediment on the thickened sludge still present in the container so that the clarified decantate may continue to discharge from the overflow. As a result, the installation will operate continuously to thicken the sludge and to remove preliminary amounts of water from it by decantation, causing the sludge to thicken from 5% to at least 8.5% dry solids, for example, and 20–40% of the sludge water and of the water introduced by way of the dilute flocculant solution to be separated prior to the main dewatering treatment.

One of the technological advantages of the inventive method is that the preliminary dewatering treatment in the decanting container does not call for additional dewatering machinery such as revolving screens or centrifuges. At the same time, the decanting container serves as an ideal mixing and maturing vessel. The flocculated sludge exhibits optimum dewatering behavior particularly if maturation time is at least two minutes; in in-line polymer addition at the sludge conduit, maturation times of this length will not be possible. Another advantage of the decanting container is that it buffers fluctuations in sludge composition and flocculant feed to prevent them from directly affecting dewatering results, as they would in the case of in-line addition.

Since the floc does not experience mechanical strain, conditioning is optimum as early as in the decanting container.

After decanting and thickening with the aid of flocculant polymers, the sludge is provided to the dewatering equipment (such as particularly a recessed plate press) preferably by means of piston-diaphragm-type pumps or occasionally—eccentric screw pumps. In the recessed plate press, the solids are retained by means of suitable filter cloth and the water is released as a filtrate. The filter cake building up in the process causes filtering pressure to rise to about 15 bar, depending on retention time. As pressure rises, less sludge will be pumped so that volume flow at batch termination will be down to 5%–10% of its initial level. The pumps cause additional strain on the flocculated sludge particularly in the high pressure phase so that its dewatering behavior will be degraded because of the destruction of the solids agglomerates, which are sensitive to shear. In accordance with the invention, it has been found now that a very small amount of flocculant will suffice for reactivating the agglomerates whereby their dewatering behavior will improve substantially. As has been discovered, flocculant dosage should be 75–90 parts of flocculant for primary or decantation flocculation and 10 to 25 parts of flocculant for secondary or reactivating flocculation. That is, the weight ratio of pre-decantation floculant addition to reactivating flocculant addition should be within the range of 3:1 to 9:1. Flocculant dosage can be varied to correspond to pressure changes in the filter press. The reactivating flocculant addition in the final or high pressure phase can be about 1.5 to 3.5 times the amount added in the non-pressurized starting phase. In the high pressure phase at more than 8 bar, the amount of reactivating flocculant (relative to solids) should preferably be twice as high as in the pressure-less initial phase.

Following termination of the filtering process, the press is relieved and opened. Dewatering results are deemed ideal where the cakes are firm and disposable and disengage without manual assistance from the filtering cloth. In sludge conditioning using inorganic additives, this result is obtained by using lime and ferrous salts, with major amounts of lime generally acting to improve cake strength and release characteristics, though at the expense of substantial amounts of additional solids in the cake, which increase the burden of disposal.

Sludge conditioning using flocculants causes problems because the filter cake will not be homogeneous and firm; also, as the recessed plate press is opened, the cakes will rarely disengage by themselves from the filter cloth, the reason frequently being an unsatisfactory distribution of the flocculant solution introduced in-line into the sludge. Also because of the nature of the flocculants (particularly those in powder form) the cake may stick firmly to the filter cloth.

In accordance with the invention, it has been found that flocculants in emulsion form are preferred for use as dewatering aids in recessed plate pressing equipment. The emulsion system causes additional hydrophobic components (white oils) to be introduced into the sludge to be dewatered; these hydrophobic components enhance cake release characteristics.

With the number of batches increasing, a hydrophobic film will form on the filter cloth so that the filter cake will disengage readily therefrom; also, the filter cloth will stay clean for a longer time.

The invention present substantial advantages for the dewatering of sewage sludge in recessed plate pressing equipment. Filter cakes having 40% solids will be obtained without the necessity of using additional solids, with the cake disengaging from the filter cloth by itself. As preparatory excess sludge water decantation reduces the hydraulic load acting on the recessed plate press, batch retention times will decrease and plant capacities increase without giving rise to additional operation costs.

COMPARATIVE EXAMPLE 1

A recessed plate press was used to dewater 7% solids digested sludge from a sewage clarification plant. To obtain disposable filter cake, 300 kgs. of white lime (lime hydrate $Ca(OH_2)$) and 20 kgs. of ferrous chloride ($FeCl_2$) per ton of sludge solids were added for conditioning.

The white lime was added as an approx. 10% aqueous milk-of-lime suspension and the ferrous chloride as a 20% aqueous solution so that the conditioning agents added about 250 liters of water per cubic meter of sludge. The conditioned sludge was pumped directly to the recessed plate press by means of a piston-diaphragm pump. After a pressing time of 120 minutes, the press was opened and emptied. The filter cakes fell from the cloth by themselves and had an average solids content of 45% Because of the inorganic solids added for sludge conditioning, the composition of the dewatered filter cake was as follows:

55%: water,
33.3%: sewage sludge solids,
1.7%: conditioning solids.

COMPARATIVE EXAMPLE 2

The digested sludge used in comparative Example 1 was conditioned with a 0.3% flocculant solution only (instead of milk of lime and ferrous salt). The flocculant was a medium-cationic copolymer (Nalco liquid polymer KP-318; cf. Nalco Publication 5D, December 1985) made by emulsion polymerization as a water-in-oil emulsion. The flocculant solution was introduced in-line on the suction side of the piston diaphragm pump in amounts dependent on sludge throughput and dry solids content (proportional to dry solids content) by means of a controlled pump. Dosage was 9.6 kgs. of polymer per ton of dry solids. 225 liters of additional water per cubic meter of sludge were supplied to the recessed plate press in the form of the dilute solution.

The press was opened after three hours; the filter cake had a solids content of only 33%,

COMPARATIVE EXAMPLE 3

The aforesaid sludge was conditioned with the polymer solution of comparative Example 2, the only difference being that the flocculant solution was introduced on the delivery side, not on the suction side of the piston-diaphragm pump. Results were similar to those in Example 2 above.

EXAMPLE 1

The sludge described above was conditioned as in comparative Example 1, except that a 0.3% flocculant solution (Nalco KP-318) was used instead of milk of lime and ferrous chloride. In contrast to comparison Examples 2 and 3, the flocculant was introduced directly upstream of the inlet of the container previously used for lime and ferrous chloride conditioning. Solids agglomerates started to form spontaneously and sedimented quickly in the conditioning container so that clear water discharged at the container overflow tube. Conditioned and flocculated sludge was supplied to the container until flocculated foam started to discharge at the overflow instead of a clear water decantate. Automatic turbidity measurement was used at this point to regulate the feed pump. This procedure resulted in a sludge density of about 13% solids below the container. The thickened sludge was pumped by a piston-diaphragm pump to the recessed plate press as in the preceding example. Additionally, a minor amount of flocculant solution (100 ppm polymer) was introduced on the delivery side right downstream of the piston-diaphragm pump, causing the floc formed for decantation to be reactivated after having passed the piston-diaphragm pump.

After 60 minutes, pressure in the recessed plate press had increased to more than 12 bars so that filtration was terminated after 80 minutes and the press opened. The filter cake formed in the process did not stick to the filter cloth, fell away by itself and had a 40% solids content—a result believed to be due to the filter cloth having been rendered hydrophobic by the emulsion polymer.

Comparison with comparative Test 1 as to filter cake composition showed the following results:

|  | Comp. Exam. 1 | Exam. 1 (Invention) |
|---|---|---|
| Water (%) | 55 | 60 |
| Sludge dry solids (%) | 33.3 | 39.9 |
| Conditioning agent (%) | 11.7 | 0.1 |

In comparison with comparative Example 1, the amount of sludge dry solids in the filter cake clearly was higher despite a retention time reduced from 120 minutes to 80 minutes. This advantage was obtained by the sewage sludge having been allowed to thicken in the conditioning container from 7% to 13% dry solids and the decanting step having removed more than 60% of the water prior to the actual dewatering treatment in the recessed plate press. A solids and water balance in the various process steps showed the following results:

| Water and Dry Solids Distribution | | |
|---|---|---|
|  | H$_2$O (%) | Dry Solids (%) |
| In sludge before conditioning | 93 | 7 |
| In sludge after decantation | 87 | 13 |
| In filter cake after dewatering | 60 | 40 |

EXAMPLE 2

Procedures were as in Example 1, except that no flocculant was added on the delivery side for reactivation.

It was not possible to open the press earlier than 100 minutes after start-up. The filter cake had an average dry solids content of 35%, with the cakes being soft and having 25% dry solids in their middle portions.

Results were inferior to those of Example 1.

Organic Polymeric Flocculant

KP-318—16 mol. % cationic acrylamide copolymer in latex form
RSV 10 to 20.

COMPARATIVE EXAMPLE 4

Procedures were as in Example 1, except that a comparable flocculant in powder form was used instead of the aforesaid emulsion polymer (Nalco KP-318)

In comparison with Example 1, the absence of a hdyrophobing effect on the filter cloth caused the filter cake to stick strongly and the filter cloth to be unclean.

Therefore we claim as follows:

1. A method of dewatering sewage sludge in a filter press including a filter cloth wherein organic polymeric flocculants are added to the sludge to improve the dewatering behavior of the sludge and water is removed from the flocculated sludge in a preparatory stage, comprising the steps of:

adding a flocculating amount of an aqueous cationic acrylamide copolymer solution to form a flocculated sludge;

maturing the flocculated sludge in a conditioning container for at least two minutes in the absence of mechanical strain prior to feeding it to the filter press, thickening the flocculated sludge in said conditioning container by separating part of the sludge water by decantation using a pump to transport the thickened sludge to the filter press;

adding an additional amount of the organic polymeric flocculant to the thickened sludge on the delivery side of the sludge pump to reactivate the flocculated solids agglomerates, wherein the weight ratio of pre-decantation flocculant addition to reactivating flocculant addition is within the range of 3:1 to 9:1; delivering the reactivated solids agglomerates directly to the filter press; and filtering the sludge to provide a filter cake containing at least about 40% dry solids which do not stick to the filter cloth, said aqueous cationic acrylamide polymer solution having been prepared by inverting a water-in-oil emulsion of the polymer, and said aqueous cationic acrylamide polymer solution containing hydrophobic components which hydrophobise the filter cloth during filtering to facilitate filter cake removal therefrom.

2. The method of claim 1 further including varying the ratio of the flocculant additions to correspond to pressure changes in the filter press.

3. The method of claim 2 further including controlling conditioning container refill and decantate separation by measuring turbidity in the conditioning container or in the decantate discharge tube thereof.

4. The method of claim 1 which includes a non-pressurized starting phase which tends towards a final or high pressure phase as sludge builds up on the filter press in which the reactivating flocculant addition in the final or high pressure phase is adjusted to about 1.5 to 3.5 times the amount added in the non-pressurized starting phase.

5. The method of claim 1 further including controlling conditioning container refill and decantate separation by measuring turbidity in the conditioning container or in the decantate discharge tube thereof.

6. The method of claim 1 in which the filter press is a recessed plate press.

* * * * *